(12) United States Patent
Xie

(10) Patent No.: US 12,311,642 B2
(45) Date of Patent: May 27, 2025

(54) VACUUM-SEALABLE PLASTIC POUCH

(71) Applicant: Braukmann GmbH, Arnsberg (DE)

(72) Inventor: Linyi Xie, Dongguan (CN)

(73) Assignee: Braukmann GmbH, Arnsberg (DE)

(\*) Notice: Subject to any disclaimer, the term of this patent is extended or adjusted under 35 U.S.C. 154(b) by 39 days.

(21) Appl. No.: 17/789,645

(22) PCT Filed: May 25, 2020

(86) PCT No.: PCT/EP2020/064421
§ 371 (c)(1),
(2) Date: Jun. 28, 2022

(87) PCT Pub. No.: WO2021/136603
PCT Pub. Date: Jul. 8, 2021

(65) Prior Publication Data
US 2023/0045878 A1 Feb. 16, 2023

(30) Foreign Application Priority Data
Dec. 29, 2019 (CN) .......................... 201911385903.5

(51) Int. Cl.
*B32B 27/08* (2006.01)
*B32B 3/30* (2006.01)
(Continued)

(52) U.S. Cl.
CPC ................ *B32B 27/08* (2013.01); *B32B 3/30* (2013.01); *B32B 27/327* (2013.01); *B32B 37/06* (2013.01);
(Continued)

(58) Field of Classification Search
CPC ......... B32B 27/08; B32B 3/30; B32B 27/327; B32B 37/06; B32B 37/10; B32B 38/06;
(Continued)

(56) References Cited

U.S. PATENT DOCUMENTS

| 7,665,896 B1\* | 2/2010 | Higgs ................ B65D 81/2038 383/105 |
| 2011/0165395 A1\* | 7/2011 | Van Hoyweghen .... B32B 27/08 428/218 |

FOREIGN PATENT DOCUMENTS

| BY | 5114 C1 | 6/2003 |
| CN | 10267013 B | 9/2014 |

(Continued)

OTHER PUBLICATIONS

Office Action and Search Report dated Aug. 17, 2023 issued in corresponding RU Application No. 2022120654; 10 pages.
(Continued)

*Primary Examiner* — James C Yager
(74) *Attorney, Agent, or Firm* — Foley & Lardner LLP

(57) ABSTRACT

A naturally degradable vacuum-sealable plastic bag, comprising a bag body, which is composed of layers compounded from a plurality of film layers (1, 2, 3), wherein a receiving cavity is formed in the middle of the bag body, which can be used for storing food, wherein at least one of the layers of film comprises a prodegradant material, wherein polyethylene is contained in the film material for preparing and manufacturing said multiple layers, wherein the added amount of prodegradant material is approximately 5% by weight of the polyethylene.

10 Claims, 2 Drawing Sheets

(51) Int. Cl.
*B32B 27/32* (2006.01)
*B32B 37/06* (2006.01)
*B32B 37/10* (2006.01)
*B32B 38/06* (2006.01)

(52) U.S. Cl.
CPC .............. *B32B 37/10* (2013.01); *B32B 38/06* (2013.01); *B32B 2250/03* (2013.01); *B32B 2250/242* (2013.01); *B32B 2307/7163* (2013.01); *B32B 2323/043* (2013.01); *B32B 2323/046* (2013.01); *B32B 2439/06* (2013.01); *Y10T 428/1352* (2015.01)

(58) Field of Classification Search
CPC .......... B32B 2250/03; B32B 2250/242; B32B 2307/7163; B32B 2323/043; B32B 2323/046; B32B 2439/06; B32B 27/18; B32B 2439/46; B32B 2439/70; B32B 27/32; B32B 2307/54; B32B 2307/5825; B32B 2307/712; B32B 2307/716; B32B 37/15; B32B 38/004; Y10T 428/1352; Y02W 90/10; C08K 3/012; C08K 5/0033; C08L 23/06; C08L 2205/025; C08L 2207/062; C08L 2207/066; C08L 2314/06; B65D 31/04; B65D 75/28; C08J 5/18; C08J 2323/06; C08J 2323/08; C08J 2423/06; C08J 2423/08
See application file for complete search history.

(56) References Cited

FOREIGN PATENT DOCUMENTS

| | | | | |
|---|---|---|---|---|
| CN | 107018827 A | | 8/2017 | |
| CN | 107522933 A | | 12/2017 | |
| CN | 0107759833 A | | 3/2018 | |
| CN | 108327368 A | | 7/2018 | |
| GB | 2247431 A | * | 3/1992 | ............. B32B 27/18 |
| JP | 3167595 B2 | | 5/2001 | |
| WO | WO-2019/000039 A1 | | 1/2019 | |

OTHER PUBLICATIONS

International Search Report & Written Opinion of the International Searching Authority issued in International Application No. PCT/EP2020/064421, mailed Aug. 20, 2020.

Office Action issued in corresponding European patent application No. 20 728 029.8, dated Dec. 11, 2023; 10 pages.

* cited by examiner

VACUUM-SEALABLE PLASTIC POUCH

CROSS REFERENCE TO RELATED APPLICATIONS

This is a National Stage Application of PCT Application No. PCT/EP2020/064421, filed on May 25, 2020, which claims priority to Chinese Patent Application No. 201911385903.5 filed on Dec. 29, 2019, the contents of which are incorporated herein by reference in their entireties.

TECHNICAL FIELD

The present invention relates to the preparation and manufacture of food packaging bags, in particular a vacuum-sealable plastic bag.

BACKGROUND

The pollution of the environment and the long-term damage to the earth due to plastic products pose major challenges for mankind. Industrialized countries in Europe and the United States have therefore successively passed legislation to reduce plastic consumption and to ban plastics. Above all in the food sector, there is annually a great need for packaging materials, and most of them pose a serious threat to the ecological environment—not to mention the high consumption of energy and resources. A large proportion of plastic products even pose a potential hazard when they are used in food packaging and the food is then consumed by humans. There are safety concerns in this respect. In addition, the mechanical strength, suitability for mass production, moisture resistance, steam resistance, and water insolubility of the plastic packaging for food products have an influence on the use of the food packaging in the market. The same is true for the stability, safety, and quality of food packaging made from novel materials during food storage.

For example, patent application CN 01129006.4 discloses a small package for marinated meat products.

A further example is patent application CN 99125782.0, which has disclosed a composite material for food packaging. It contains a core layer and an outer layer, wherein the core layer is coated with an outer layer containing aluminum foil.

A further example is patent application CN 201310420320.8, which discloses a functional, multi-layer cling film made of a composite. According to the five-layer structure made of PE/EVOH/PA/EVOH/PE, appropriate additives are added to each layer and functional multi-layer composite cling films are produced therefrom by way of co-extrusion blow molding.

SUMMARY OF THE INVENTION

A problem to be solved by the present invention is the provision of an improved vacuum-sealable plastic bag.

The following technical concepts of the present invention serve to solve the problem.

A naturally degradable vacuum-sealable plastic bag is designed as follows: The vacuum-sealable plastic bag contains a bag body. The bag body is composed of layers compounded from a plurality of film layers, and a receiving cavity is formed in the middle of said bag body, preferably between two of these layers. The receiving cavity can be used in order to store food. In addition, one or more of the film layers comprise a prodegradant material, wherein polyethylene is also contained in the film material for the preparation and manufacture of said plurality of layers. The added amount of the prodegradant material is approximately 5% by weight of the polyethylene.

Most traditional vacuum plastic bags are not degradable. In some degradable plastic bags, the degradation is not effective. The decomposition of the mixed degradable components can also lead to secondary environmental pollution. In addition, they are strongly influenced by the environment and are unstable. The degradation can only take place under certain environmental conditions.

The proposed naturally degradable vacuum-sealable plastic bag can effectively reduce environmental pollution and increase the safety and stability of the food storage.

Preferred embodiments are explained below, which, lacking any experience to the contrary, can be advantageously combined with one another.

Preferably, the added amount of the prodegradant material is approximately 1 to 10% by weight of the polyethylene, and more preferably 3 to 7% by weight of the polyethylene.

Preferably, the polyethylene contained in an outer film layer material of the bag body is a mixture of HDPE (High Density Polyethylene), LLDPE (Linear Low-Density Polyethylene), and metallocene Linear Low Density Polyethylene (mLLDPE) in the weight ratio of 1-3:1-10:1-7 and is prepared and manufactured by way of a co-extrusion, casting, blowing, and molding process.

Preferably, polyethylene contained in an inner film layer material of the bag body is a mixture of LDPE (Low Density Polyethylene) and LLDPE (Linear Low-Density Polyethylene) in the weight ratio of 1-7:1-15 and is prepared and manufactured by way of the co-extrusion, casting, blowing, and molding process.

Preferably, the film layers of the plurality of layers are two film layers or more than two film layers. When the film layers of the plurality of layers are more than two film layers, then the polyethylene contained in a middle film layer material is a mixture of LDPE (Low Density Polyethylene), LLDPE (Linear Low-Density Polyethylene), and metallocene Linear Low Density Polyethylene (mLLDPE) in the weight ratio of 1-3:1-8:1-5 and is prepared and manufactured by way of the co-extrusion, casting, blowing, and molding process.

Preferably, the prodegradant material is an oxidatively biodegradable additive with polyethylene as a carrier. The additive can be a metal stearate, in particular a manganese stearate. The additive can also contain a stabilizer. The additive known under the brand name "D2 W" by Symphony Plastic Technologies can advantageously be used as the oxidatively degrading additive.

Preferably, the outer film layer of the bag body, which is prepared and manufactured by the mixed co-extrusion blow-molding, is subjected to an orientation and expansion treatment.

Preferably, the inner film layer of the bag body, which is prepared and manufactured by the mixed co-extrusion blow-molding, is not subjected to any orientation and expansion treatment.

Preferably, after the inner film layer is formed, stripe-like or dot-like air channels are embossed on the surface thereof.

Preferably, the co-extrusion, casting, blowing, and molding process comprises the following:
 addition of the raw material into the extruder,
 temperature increase to 180-350° C. in order to form a melt mixture, subsequently, rapid temperature reduction to 65-85° C. at a cooling rate of 15° C./sec, and transfer of the cooled melt mixture for casting on the casting bed that has already been preheated to 45-65° C.

With a film blowing machine having a nozzle slit of less than 1.0 mm and a rotational speed of 10 to 20 r/min, the film layers are blown and cooled.

After shaping, the film layers are formed.

Preferably, the compounding of the film layers of the plurality of layers contains the sequential lamination of the prepared and manufactured inner film layer and outer film layer, or the inner film layer, middle film layer, and outer film layer. By way of hot pressing with a roller and forming, the vacuum-sealable plastic bag, including the bag body, is made.

Using the above technical solutions, the present invention has the following advantages compared to the current prior art:

1. In the vacuum-sealable plastic bag of the present invention, different film layers are formed after a certain combination and ratio of HDPE (high density polyethylene), LDPE (low density polyethylene), LLDPE (linear low-density polyethylene), and metallocene linear low-density polyethylene (mLLDPE). The outer film layer thus has significant tensile strength, tear strength, environmental stress crack resistance, cold resistance, weather resistance, and puncture resistance, and the inner and middle film layers have significant compatibility and stability. The overall performance of the sealable plastic bag can safely meet the needs of food packaging, thus ensuring the quality of the food storage.

2. In the present invention, the oxidative, biodegradable additive D2W is added with a polyethylene carrier resin. It promotes the oxidative degradation of the vacuum-sealable plastic bag in the natural environment without causing any secondary pollution, which conforms to the ideal of sustainable production.

3. The vacuum-sealable plastic bag of the present invention has not only good degradability but also other advantages, such as high safety and stability. During the preparation and manufacturing process, no superfluous starting material is added. Merely by compounding different polyethylene materials, the addition of poorly degradable components, or components that may affect human health, can be reduced during the preparation and manufacturing process of the plastic bag. In addition, the simple components make the process of preparing and manufacturing the plastic bag according to the present invention easy. The process steps are easy to control, costs are reduced, and mass production is possible.

EXEMPLARY EMBODIMENTS

EXPLANATION OF THE SYMBOLS OF THE FIGURES

1—Outer film layer
2—Middle film layer
3—Inner film layer

In the following, exemplary embodiments of the present invention are described in further detail in combination with the figures. It should be noted here that the descriptions of the exemplary embodiments are provided for understanding of the present invention; however, they do not constitute any limitations on the present invention. In addition, the respective technical features described below can be combined in the various exemplary embodiments of the present invention, to the extent to which they do not conflict with each other.

Exemplary Embodiment 1

Figure 1:
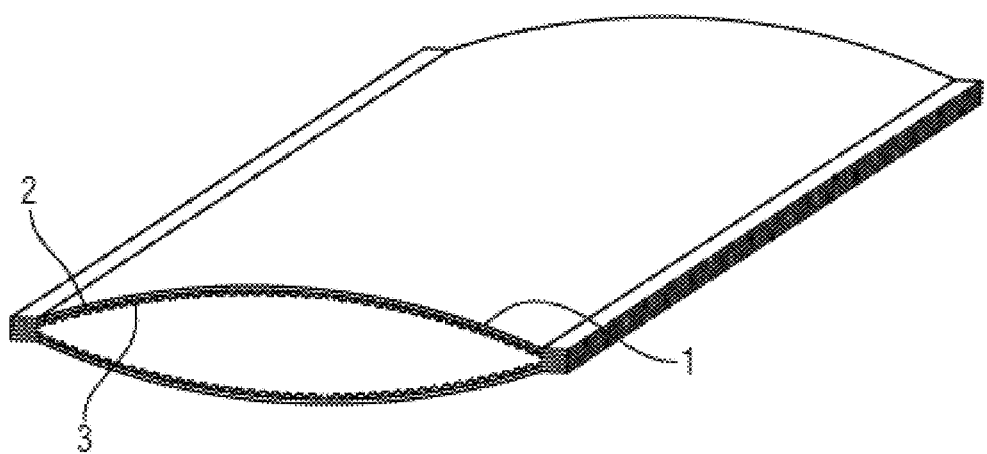
FIG. 1 shows a schematic view of a naturally degradable vacuum-sealable plastic bag in one of the exemplary embodiments of the present invention.

As shown in FIG. 1, the present invention provides a naturally degradable vacuum-sealable plastic bag. The vacuum-sealable plastic bag contains a bag body. The bag body is composed of layers compounded from a plurality of film layers, and a receiving cavity is formed in the middle of the bag body, preferably between two of these layers. The receiving cavity can be used in order to store food. In addition, at least one film layer among the plurality of layers comprises the prodegradant material, wherein polyethylene is also contained in the film material for the preparation and manufacture of the plurality of layers. The added amount of the prodegradant material is approximately 5% by weight of the polyethylene.

Additionally, the compounding of the film layers of the plurality of layers contains the sequential lamination of the prepared and manufactured inner film layer and outer film layer, or the inner film layer, middle film layer, and outer film layer. By way of hot pressing with a roller and forming, the vacuum-sealable plastic bag, including the bag body, is made.

Additionally, in this exemplary embodiment, the polyethylene contained in the outer film layer material of the bag body is a mixture of HDPE (High Density Polyethylene), LLDPE (Linear Low-Density Polyethylene), and metallocene Linear Low Density Polyethylene (mLLDPE) in the weight ratio of 1:1:1 and is prepared and manufactured by way of the co-extrusion, casting, blowing, and molding process.

The polyethylene contained in the inner film layer material of the bag body is a mixture of LDPE (Low Density Polyethylene) and LLDPE (Linear Low-Density Polyethylene) in the weight ratio of 1:1 and is prepared and manufactured by way of the co-extrusion, casting, blowing, and molding process. The film layers of the plurality of layers are two film layers or more than two film layers.

When the film layers of the plurality of layers are more than two film layers, then the polyethylene contained in the middle film layer material is a mixture of LDPE (Low Density Polyethylene), LLDPE (Linear Low-Density Polyethylene), and metallocene Linear Low Density Polyethylene (mLLDPE) in the weight ratio of 1:1:1 and is prepared and manufactured by way of the co-extrusion, casting, blowing, and molding process. The density of LLDPE (Linear Low-Density Polyethylene) is 0.918 g/cm, and the structural formula is [CH2-CH2]n-.

Additionally, the prodegradant material in this exemplary embodiment is the oxidatively biodegradable additive D2W with polyethylene as a substrate.

The outer film layer of the bag body, which is prepared and manufactured by the mixed co-extrusion blow-molding, is subjected to an orientation and expansion treatment.

The inner film layer of said bag body, which is prepared and manufactured by the mixed co-extrusion blow-molding, is not subjected to any orientation and expansion treatment.

After the inner film layer is formed, stripe-like or dot-like air channels are embossed on the surface thereof.

In this exemplary embodiment, the co-extrusion, casting, blowing, and molding process refers to the following: addition of the raw material into the extruder, temperature increase to 180° C. in order to form a melt mixture, subsequently, rapid temperature reduction to 65° C. at a cooling rate of 15° C./sec and transfer of the cooled melt mixture for casting on the casting bed that has already been preheated to 45° C. With the film blowing machine having a nozzle slit of less than 1.0 mm and a rotational speed of 10 r/min, the film layers are blown and cooled. After shaping, the film layers are formed. By way of hot pressing with a roller and forming of the film layers, the vacuum-sealable plastic bag, including the bag body, is made.

Exemplary Embodiment 2

As shown in FIG. 1, the present invention provides a naturally degradable vacuum-sealable plastic bag. The vacuum-sealable plastic bag contains a bag body. The bag body is composed of layers compounded from a plurality of film layers, and a receiving cavity is formed in the middle of the bag body, preferably between two of these layers. The receiving cavity can be used in order to store food. In addition, there is at least one film layer among the plurality of layers, which uses the prodegradant material, wherein polyethylene is also contained in the film material for the preparation and manufacture of the plurality of layers. The added amount of the prodegradant material is approximately 5% by weight of said polyethylene.

Additionally, the compounding of the film layers of the plurality of layers refers to the sequential lamination of the prepared and manufactured inner film layer and outer film layer, or the inner film layer, middle film layer, and outer film layer. By way of hot pressing with a roller and forming, the vacuum-sealable plastic bag, including the bag body, is made.

Additionally, in this exemplary embodiment, the polyethylene contained in the outer film layer material of the bag body is a mixture of HDPE (High Density Polyethylene), LLDPE (Linear Low-Density Polyethylene), and metallocene Linear Low Density Polyethylene (mLLDPE) in the weight ratio of 3:10:7 and is prepared and manufactured by way of the co-extrusion, casting, blowing, and molding process.

The polyethylene contained in the inner film layer material of the bag body is a mixture of LDPE (Low Density Polyethylene) and LLDPE (Linear Low-Density Polyethylene) in the weight ratio of 7:15 and is prepared and manufactured by way of the co-extrusion, casting, blowing, and molding process.

The film layers of the plurality of layers are two film layers or more than two film layers. When the film layers of the plurality of layers are more than two film layers, then the polyethylene contained in the middle film layer material is a mixture of LDPE (Low Density Polyethylene), LLDPE (Linear Low-Density Polyethylene), and metallocene Linear Low Density Polyethylene (mLLDPE) in the weight ratio of 3:8:5 and is prepared and manufactured by way of the co-extrusion, casting, blowing, and molding process. The density of LLDPE (Linear Low-Density Polyethylene) is 0.935 g/cm, and the structural formula is [CH2-CH2]n-.

Additionally, the prodegradant material in this exemplary embodiment is the oxidatively biodegradable additive D2W with polyethylene as a substrate.

The outer film layer of the bag body, which is prepared and manufactured by the mixed co-extrusion blow-molding, is subjected to an orientation and expansion treatment.

The inner film layer of the bag body, which is prepared and manufactured by said mixed co-extrusion blow-molding, is not subjected to any orientation and expansion treatment.

After the inner film layer is formed, stripe-like or dot-like air channels are embossed on the surface thereof.

In this exemplary embodiment, the co-extrusion, casting, blowing, and molding process contains the following: addition of the raw material into the extruder, temperature increase to 350° C. in order to form a melt mixture, subsequently, rapid temperature reduction to 85° C. at a cooling rate of 15° C./sec and transfer of the cooled melt mixture for casting on the casting bed that has already been preheated to 65° C. With the film blowing machine having a nozzle slit of less than 1.0 mm and a rotational speed of 20 r/min, the film layers are blown and cooled. After shaping, the film layers are formed. By way of hot pressing with a roller and forming of the film layers, the vacuum-sealable plastic bag, including the bag body, is made.

Exemplary Embodiment 3

As shown in FIG. 1, the present invention provides a naturally degradable vacuum-sealable plastic bag. The vacuum-sealable plastic bag contains a bag body. The bag body is composed of layers compounded from a plurality of film layers, and a receiving cavity is formed in the middle of the bag body, preferably between two of these layers. The receiving cavity can be used in order to store food. In addition, there is at least one film layer among the plurality of layers, which uses the prodegradant material, wherein polyethylene is also contained in the film material for the preparation and manufacture of the plurality of layers. The added amount of the prodegradant material is approximately 5% by weight of said polyethylene.

Additionally, the compounding of the film layers of the plurality of layers contains the sequential lamination of the prepared and manufactured inner film layer and outer film layer, or the inner film layer, middle film layer, and outer film layer. By way of hot pressing with a roller and forming, the vacuum-sealable plastic bag, including the bag body, is made. In this exemplary embodiment, the film layer made of three layers is preferred. These are, in order, the inner film layer, the middle film layer, and the outer film layer.

Additionally, in this exemplary embodiment, the polyethylene contained in the outer film layer material of the bag body is a mixture of HDPE (High Density Polyethylene), LLDPE (Linear Low-Density Polyethylene), and metallocene Linear Low Density Polyethylene (mLLDPE) in the weight ratio of 2:5:5 and is prepared and manufactured by way of the co-extrusion, casting, blowing, and molding process.

The polyethylene contained in the inner film layer material of the bag body is a mixture of LDPE (Low Density Polyethylene) and LLDPE (Linear Low-Density Polyethylene) in the weight ratio of 4:10 and is prepared and manufactured by way of the co-extrusion, casting, blowing, and molding process.

The film layers of the plurality of layers are two film layers or more than two film layers. When the film layers of the plurality of layers are more than two film layers, then the polyethylene contained in the middle film layer material is a mixture of LDPE (Low Density Polyethylene), LLDPE (Linear Low-Density Polyethylene), and metallocene Linear Low Density Polyethylene (mLLDPE) in the weight ratio of 2:7:3 and is prepared and manufactured by way of the co-extrusion, casting, blowing, and molding process. The density of LLDPE (Linear Low-Density Polyethylene) is 0.935 g/cm, and the structural formula is [CH2-CH2]n-.

Additionally, the prodegradant material in this exemplary embodiment is the oxidatively biodegradable additive D2W with polyethylene as a substrate.

The outer film layer of the bag body, which is prepared and manufactured by the mixed co-extrusion blow-molding, is subjected to an orientation and expansion treatment.

The inner film layer of the bag body, which is prepared and manufactured by said mixed co-extrusion blow-molding, is not subjected to any orientation and expansion treatment.

After the inner film layer is formed, stripe-like or dot-like air channels are embossed on the surface thereof.

In this exemplary embodiment, the co-extrusion, casting, blowing, and molding process refers to the following: addition of the raw material into the extruder, temperature increase to 220° C. in order to form a melt mixture, subsequently, rapid temperature reduction to 70° C. at a cooling rate of 15° C./sec and transfer of the cooled melt mixture for casting on the casting bed that has already been preheated to 50° C. With the film blowing machine having a nozzle slit of less than 1.0 mm and a rotational speed of 15 r/min, the film layers are blown and cooled. After shaping, the film layers are formed. By way of hot pressing with a roller, vacuuming, and forming of the film layers, the vacuum-sealable plastic bag, including the bag body, is made.

Comparative Example 1

The present invention provides a naturally degradable vacuum-sealable plastic bag. The vacuum-sealable plastic bag contains a bag body. The bag body is composed of layers compounded from a plurality of film layers, and a receiving cavity is formed in the middle of the bag body, preferably between two of these layers. The receiving cavity can be used in order to store food. In addition, there is at least one film layer among the plurality of layers, which uses the prodegradant material, wherein polyethylene is also contained in the film material for the preparation and manufacture of the plurality of layers. The added amount of the prodegradant material is 5% by weight of the polyethylene.

Additionally, the compounding of the film layers of the plurality of layers contains the sequential lamination of the prepared and manufactured inner film layer and outer film layer, or the inner film layer, middle film layer, and outer film layer. By way of hot pressing with a roller and forming, the vacuum-sealable plastic bag, including the bag body, is made.

Additionally, in this comparative example, the polyethylene contained in the outer film layer material of the bag body is a mixture of HDPE (High Density Polyethylene), LLDPE (Linear Low-Density Polyethylene), and metallocene Linear Low Density Polyethylene (mLLDPE) in the weight ratio of 7:5:10 and is prepared and manufactured by way of the co-extrusion, casting, blowing, and molding process.

The polyethylene contained in the inner film layer material of the bag body is a mixture of LDPE (Low Density Polyethylene) and LLDPE (Linear Low-Density Polyethylene) in the weight ratio of 9:10 and is prepared and manufactured by way of the co-extrusion, casting, blowing, and molding process.

The film layers of the plurality of layers are two film layers or more than two film layers. When the film layers of the plurality of layers are more than two film layers, then the polyethylene contained in the middle film layer material is a mixture of LDPE (Low Density Polyethylene), LLDPE (Linear Low-Density Polyethylene), and metallocene Linear Low Density Polyethylene (mLLDPE) in the weight ratio of 15:7:8 and is prepared and manufactured by way of the co-extrusion, casting, blowing, and molding process. The density of LLDPE (Linear Low-Density Polyethylene) is 0.935 g/cm, and the structural formula is [CH2-CH2]n-.

Additionally, the prodegradant material in this comparative example is the oxidatively biodegradable additive D2W with polyethylene as a substrate.

The outer film layer of the bag body, which is prepared and manufactured by the mixed co-extrusion blow-molding, is subjected to an orientation and expansion treatment.

The inner film layer of the bag body, which is prepared and manufactured by said mixed co-extrusion blow-molding, is not subjected to any orientation and expansion treatment.

After the inner film layer is formed, stripe-like or dot-like air channels are embossed on the surface thereof.

In this comparative example, the co-extrusion, casting, blowing, and molding process contains the following: addition of the raw material into the extruder, temperature increase to 220° C. in order to form a melt mixture, subsequently, rapid temperature reduction to 70° C. at a cooling rate of 15° C./sec and transfer of the cooled melt mixture for casting on the casting bed that has already been preheated to 50° C. With the film blowing machine having a nozzle slit of less than 1.0 mm and a rotational speed of 15 r/min, the film layers are blown and cooled. After shaping, the film layers are formed. By way of hot pressing and forming of the film layers with a roller, the vacuum-sealable plastic bag, including the bag body, is made.

Comparative Example 2

The present invention provides a vacuum-sealable plastic bag. The vacuum-sealable plastic bag contains a bag body. The bag body is composed of layers compounded from a plurality of film layers, and a receiving cavity is formed in the middle of the bag body, preferably between two of these layers. The receiving cavity can be used for storing food, wherein polyethylene is contained in the film material for preparing and producing the plurality of layers.

Additionally, the compounding of the film layers of the plurality of layers refers to the sequential lamination of the prepared and manufactured inner film layer and outer film layer, or the inner film layer, middle film layer, and outer film layer. By way of hot pressing with a roller and forming, the vacuum-sealable plastic bag, including the bag body, is made.

Additionally, in this comparative example, the polyethylene contained in the outer film layer material of the bag body is a mixture of HDPE (High Density Polyethylene), LLDPE (Linear Low-Density Polyethylene), and metallocene Linear Low Density Polyethylene (mLLDPE) in the weight ratio of 2:5:5 and is prepared and manufactured by way of the co-extrusion, casting, blowing, and molding process.

The polyethylene contained in the inner film layer material of the bag body is a mixture of LDPE (Low Density Polyethylene) and LLDPE (Linear Low-Density Polyethylene) in the weight ratio of 4:10 and is prepared and manufactured by way of the co-extrusion, casting, blowing, and molding process.

The film layers of the plurality of layers are two film layers or more than two film layers. When the film layers of the plurality of layers are more than two film layers, then the polyethylene contained in the middle film layer material is a mixture of LDPE (Low Density Polyethylene), LLDPE (Linear Low-Density Polyethylene), and metallocene Linear Low Density Polyethylene (mLLDPE) in the weight ratio of 2:7:3 and is prepared and manufactured by way of the co-extrusion, casting, blowing, and molding process. The density of LLDPE (Linear Low-Density Polyethylene) is 0.935 g/cm, and the structural formula is [CH2-CH2]n-.

Additionally, the outer film layer of the bag body in this comparative example, which is prepared and manufactured by the mixed co-extrusion blow-molding, is subjected to an orientation and expansion treatment. The inner film layer of the bag body, which is prepared and manufactured by said mixed co-extrusion blow-molding, is not subjected to any orientation and expansion treatment. After the inner film layer is formed, stripe-like or dot-like air channels are embossed on the surface thereof.

In this comparative example, the co-extrusion, casting, blowing, and molding process contains the following: addition of the raw material into the extruder, temperature increase to 220° C. in order to form a melt mixture, subsequently, rapid temperature reduction to 70° C. at a cooling rate of 15° C./sec and transfer of the cooled melt mixture for casting on the casting bed that has already been preheated to 50° C. With the film blowing machine having a nozzle slit of less than 1.0 mm and a rotational speed of 15 r/min, the film layers are blown and cooled. After shaping, the film layers are formed. By way of hot pressing with a roller and forming of the film layers, the vacuum-sealable plastic bag, including the bag body, is made.

Comparative Example 3

Comparative example 3 is a commercially available vacuum-sealable plastic bag. It is a product that the person skilled in the art in this field purchases on the market on the basis of the product description. Based on the product description, the plastic product is made from a raw material of the polyethylene type. In the present invention, it is used for comparison.

The performance tests were conducted on the naturally degradable vacuum-sealable plastic bags manufactured in exemplary embodiments 1 to 3. In the comparative examples, these are the vacuum-sealable plastic bags produced in 1 to 2 as well as the conventional, commercially available sealable plastic bags in comparative example 3. The results are shown in Tab. 1:

TABLE 1

| Group | Degree of natural degradability | Tear strength | Weather resistance | Cold resistance | Stability |
|---|---|---|---|---|---|
| Exemplary embodiment 1 | Significant | Significant | Significant | Significant | Significant |
| Exemplary embodiment 2 | Significant | Significant | Significant | Significant | Significant |
| Exemplary embodiment 3 | Significant | Significant | Significant | Significant | Significant |
| Comparative example 1 | Average | Poor | Average | Good | Good |
| Comparative example 2 | Poor | Poor | Good | Good | Good |
| Comparative example 3 | Poor | Poor | Average | Good | Good |

The performance analysis of the results in Tab. 1 shows that the vacuum-sealable plastic bag according to the present invention has significant natural degradability, apart from its durability. It also has significant weather resistance, cold resistance, and a significant stability. In addition, the vacuum-sealable plastic bag according to the present invention performs well in other areas, which are explained in other patent specifications. However, when it comes to chemical products, there are too many relevant performance parameters, and only a few have been selected here for explanation. The others are not described in detail here.

Test for Accelerated Aging and Thermal Stability

In the laboratory, the real-time stability of the polymer products stored at room temperature can be determined in a relatively short time by monitoring the degradation during the thermal aging process at high temperatures, according to ASTM D5510. For this purpose, it can be avoided that they are exposed to sunlight for a long time.

The polymer degradation is assessed by determining the polymer oxidation by means of infrared spectroscopy. An increase in the characteristic amount of the infrared spectrum corresponding to the carbonyl product from the polymer oxidation is recorded as the carbonyl optical density. If no significant increase in carbonyl optical density is observed (no more than 0.0010) during accelerated aging time, then this is considered to be an indication of the real-time stability of the product under storage conditions.

The naturally degradable and vacuum-sealable plastic bag manufactured in exemplary embodiment 3 was selected as a test sample. The stability and degradation behavior of the naturally degradable vacuum-sealable plastic bag were evaluated by means of an accelerated laboratory aging. The results are shown in Tab. 2:

TABLE 2

| Accelerated aging time (AAT)/h | Carbonyl optical density (IR Abs 1714 cm−1/rigidity) |
|---|---|
| 0 | 0.0000 |
| 72 | −0.0001 |
| 165 | 0.0001 |
| 287 | 0.0000 |
| 410 | 0.0000 |
| 479 | 0.0000 |
| 575 | 0.0001 |

Tab. 2 shows that no obvious oxidation was observed during the accelerated stability test. The sample shows that the average value of the carbonyl optical density with accelerated aging up to 575 hours did not exceed 0.0001. Likewise, under the test conditions, no degradation behavior of the vacuum-sealable plastic bag according to the present invention occurred. This is an indication that the vacuum-sealable plastic bag according to the present invention has a relatively high stability within its lifetime.

Accelerated Aging Test for Thermal Degradation after Initial UV Exposure

In the laboratory, the degradation of polymers that have been exposed to sunlight under initially dark conditions can be determined in a relatively short time by monitoring the degradation during the accelerated fluorescent UV aging.

This is performed according to ASTM D5208, followed by thermal aging at high temperature according to ASTM D5510.

The polymer degradation is assessed by determining the polymer oxidation by means of infrared spectroscopy. An increase in the characteristic amount of the infrared spectrum corresponding to the carbonyl product from the polymer oxidation is recorded as the carbonyl optical density. The carbonyl optical density of 0.0100 is considered to be pre-degradation, which leads to a spontaneous embrittlement.

The naturally degradable and vacuum-sealable plastic bag manufactured in exemplary embodiment 3 was selected as a test sample. First, the sample was subjected to a constant fluorescent UV aging for 48 hours, followed by an accelerated thermal aging under dark conditions. By monitoring the changes in the carbonyl optical density over aging time, the rate of the degradation was determined and compared. The results are shown in Tab. 3:

TABLE 3

| Accelerated aging time (AAT)/h | Exposure | Carbonyl optical density (IR Abs 1714 cm−1/rigidity) |
| --- | --- | --- |
| 0 | UV | 0.0000 |
| 48 | | 0.0010 |
| 94 | Heating | 0.0033 |
| 141 | | 0.0066 |
| 240 | | 0.0133 |
| 288 | | 0.0165 |

Figure 2:
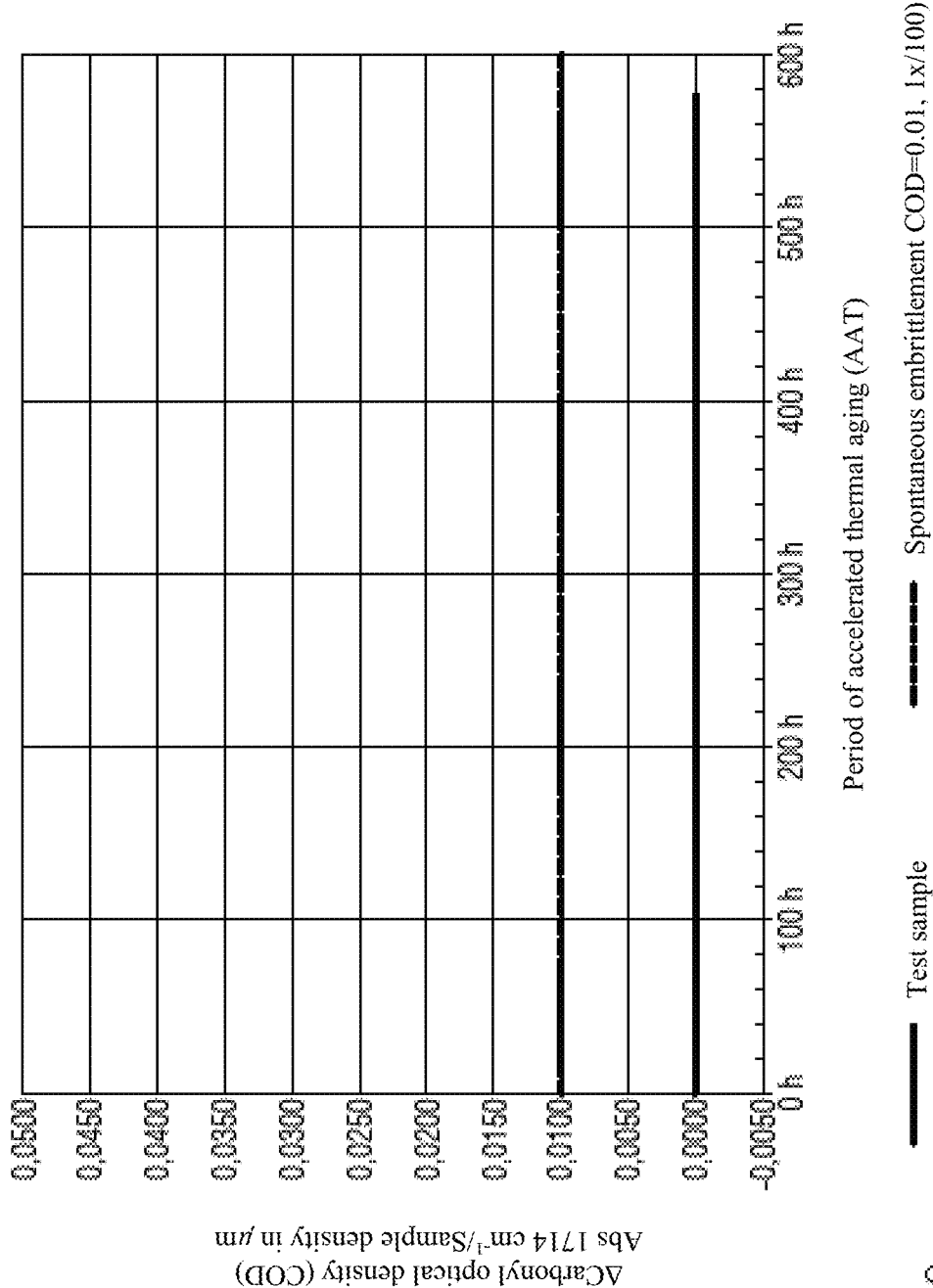
FIG. 2 is a schematic view of the carbonyl optical density of a naturally degradable vacuum-sealable plastic bag in the accelerated thermal aging process in one of the exemplary embodiments of the present invention.

The analysis of Tab. 3 in combination with FIG. 2 shows that the test sample demonstrated a significant increase in the carbonyl optical density during the accelerated aging process. The sample demonstrated a carbonyl optical density value of 0.0165 after 288 hours of exposure (including 48 hours of an initial fluorescent UV exposure). This shows that the sample has already degraded significantly and that the vacuum-sealable plastic bag according to the present invention can degrade under natural conditions when it has exceeded its useful life.

In summary: The naturally degradable and vacuum-sealable plastic bag according to the present invention has the advantages of high safety performance, high stability, and good weather resistance within its lifetime. In addition, no secondary pollution occurs during degradation, making it environmentally friendly. Moreover, the manufacturing method is simple and suitable for mass production.

The embodiments of the present invention have been described in detail above in combination with the drawings. However, the present invention is not limited to the embodiments described. For the person skilled in the art in this field, the many changes, revisions, substitutions, and modifications of the embodiments still fall within the protected scope of the present invention, to the extent to which they do not depart from the spirit and principle of the present invention.

The invention also relates to the following subject-matters:

1. A naturally degradable vacuum-sealable plastic bag, comprising the following features: Said vacuum-sealable plastic bag contains a bag body; said bag body is composed of layers compounded from a plurality of film layers, and a receiving cavity is formed in the middle of said bag body; said receiving cavity is used for storing food; in addition, there is at least one film layer among said plurality of layers that uses the prodegradant material, wherein polyethylene is contained in the film material for preparing and manufacturing said plurality of layers; in terms of the mass percentage, the added amount of said prodegradant material is 5% of said polyethylene.

2. A naturally degradable vacuum-sealable plastic bag according to subject-matter 1, comprising the following features: The polyethylene contained in the outer film layer material of said bag body is a mixture of HDPE (High Density Polyethylene), LLDPE (Linear Low-Density Polyethylene), and metallocene Linear Low Density Polyethylene (mLLDPE) in the weight ratio of 1-3:1-10:1-7 and is prepared and manufactured by way of the co-extrusion, casting, blowing, and molding process.

3. A naturally degradable vacuum-sealable plastic bag according to subject-matter 1, comprising the following features: The polyethylene contained in the inner film layer material of said bag body is a mixture of LDPE (Low Density Polyethylene) and LLDPE (Linear Low-Density Polyethylene) in the weight ratio of 1-7:1-15 and is prepared and manufactured by way of the co-extrusion, casting, blowing, and molding process.

4. A naturally degradable vacuum-sealable plastic bag according to subject-matter 1, comprising the following features: The film layers of the said plurality of layers are two film layers or more than two film layers; when the film layers of the plurality of layers are more than two film layers, then the polyethylene contained in said middle film layer material is a mixture of LDPE (Low Density Polyethylene), LLDPE (Linear Low-Density Polyethylene), and metallocene Linear Low Density Polyethylene (mLLDPE) in the weight ratio of 1-3:1-8:1-5 and is prepared and manufactured by way of the co-extrusion, casting, blowing, and molding process.

5. A naturally degradable vacuum-sealable plastic bag according to subject-matter 1, comprising the following feature: Said prodegradant material is the oxidatively biodegradable additive D2W with polyethylene as a carrier.

6. A naturally degradable vacuum-sealable plastic bag according to subject-matter 2, comprising the following feature: The outer film layer of said bag body, which is prepared and manufactured by said mixed co-extrusion blow-molding, is subjected to an orientation and expansion treatment.

7. A naturally degradable vacuum-sealable plastic bag according to subject-matter 3, comprising the following feature: The inner film layer of said bag body, which is prepared and manufactured by said mixed co-extrusion blow-molding, is not subjected to any orientation and expansion treatment.

8. A naturally degradable vacuum-sealable plastic bag according to subject-matter 3, comprising the following feature: After said inner film layer is formed, stripe-like or dot-like air channels are embossed on the surface thereof.
9. A naturally degradable vacuum-sealable plastic bag according to any one of subject-matters 2 to 4, comprising the following features: Said co-extrusion, casting, blowing, and molding process refers to the following: addition of the raw material into the extruder, temperature increase to 180-350° C. in order to form a melt mixture, subsequently, rapid temperature reduction to 65-85° C. at a cooling rate of 15° C./sec and transfer of the cooled melt mixture for casting on the casting bed that has already been preheated to 45-65° C.; blowing and cooling of the films with the film blowing machine with a nozzle slit of less than 1.0 mm and a rotational speed of 10 to 20 r/min; after shaping, the film layers are formed.
10. A naturally degradable vacuum-sealable plastic bag according to subject-matter 1, comprising the following features: The compounding of the film layers of said plurality of layers refers to the sequential lamination of the prepared and manufactured inner film layer and outer film layer, or the inner film layer, middle film layer, and outer film layer; by way of hot pressing with a roller and forming, said vacuum-sealable plastic bag, including the bag body, is made.

The invention claimed is:
1. A naturally degradable vacuum-sealable plastic bag, comprising a bag body, which is composed of layers compounded from a plurality of film layers,
wherein a receiving cavity is formed in the middle of the bag body, which can be used for storing food,
wherein at least one of the layers of film comprises a prodegradant material, wherein polyethylene is contained in the film material for preparing and manufacturing said multiple layers, wherein the added amount of prodegradant material is approximately 5% by weight of the polyethylene, wherein the polyethylene contained in an outer film layer material (1) of the bag body is a mixture of HDPE (High Density Polyethylene), LLDPE (Linear Low-Density Polyethylene), and metallocene Linear Low Density Polyethylene (mLLDPE) in the weight ratio of 1:1:1, 3:10:7 or 2:5:5, and is prepared and manufactured by way of a co-extrusion, casting, blowing, and molding process.
2. A plastic bag according to claim 1, wherein the polyethylene contained in an inner film layer material (3) of the bag body is a mixture of LDPE (Low Density Polyethylene) and LLDPE (Linear Low-Density Polyethylene) in the weight ratio of 1-7:1-15 and is prepared and manufactured by way of the co-extrusion, casting, blowing, and molding process.
3. A plastic bag according to claim 1, wherein the film layers are two film layers or more than two film layers; when the film layers are more than two film layers, then the polyethylene contained in the middle film layer material is a mixture of LDPE (Low Density Polyethylene), LLDPE (Linear Low-Density Polyethylene), and metallocene Linear Low Density Polyethylene (mLLDPE) in the weight ratio of 1-3:1-8:1-5 and is prepared and manufactured by way of the co-extrusion, casting, blowing, and molding process.
4. A plastic bag according to claim 1, wherein the prodegradant material is an oxidatively biodegradable additive with polyethylene as the carrier.
5. A plastic bag according to claim 1, wherein the outer film layer of the bag body, which is prepared and manufactured by the co-extrusion, casting, blowing, and molding process, is subjected to an orientation and expansion treatment.
6. A plastic bag according to claim 2, wherein the inner film layer of the bag body, which is prepared and manufactured by the co-extrusion, casting, blowing, and molding process, is not subjected to any orientation and expansion treatment.
7. A plastic bag according to claim 2, wherein, after the inner film layer is formed, air channels are embossed on the surface thereof.
8. A plastic bag according to claim 1, wherein the co-extrusion, casting, blowing, and molding process comprises the following:
addition of the raw material into the extruder,
temperature increase to 180-350° C. in order to form a melt mixture,
subsequently, rapid temperature reduction to 65-85° C. at a cooling rate of 15° C./sec and transfer of the cooled melt mixture for casting on the casting bed that has already been preheated to 45-65° C.;
blowing and cooling of the films with the film blowing machine with a nozzle slit of less than 1.0 mm and a rotational speed of 10 to 20 r/min; after shaping, the film layers are formed.
9. A plastic bag according to claim 1, wherein the compounding of the film layers of the plurality of layers contains the sequential lamination of a prepared and manufactured inner film layer and the outer film layer, or an inner film layer, a middle film layer, and the outer film layer; by way of hot pressing with a roller and forming, the vacuum-sealable plastic bag, including the bag body, is made.
10. A plastic bag according to claim 4, wherein the oxidatively biodegradable additive comprises a metal stearate.

* * * * *